United States Patent
Jayat

(10) Patent No.: US 9,896,983 B2
(45) Date of Patent: Feb. 20, 2018

(54) EXHAUST GAS TREATMENT UNIT COMPRISING FLOW DIVIDING AND MIXING GUIDE ELEMENTS

(71) Applicant: EMITEC GESELLSCHAFT FÜR EMISSIONSTECHNOLOGIE MBH, Lohmar (DE)

(72) Inventor: Francois Jayat, Wachtberg-Niederbachem (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/912,010

(22) PCT Filed: Jul. 30, 2014

(86) PCT No.: PCT/EP2014/066324
§ 371 (c)(1),
(2) Date: Feb. 12, 2016

(87) PCT Pub. No.: WO2015/022187
PCT Pub. Date: Feb. 19, 2015

(65) Prior Publication Data
US 2016/0194994 A1    Jul. 7, 2016

(30) Foreign Application Priority Data
Aug. 13, 2013 (DE) .................. 10 2013 108 745

(51) Int. Cl.
*F01N 3/00*    (2006.01)
*F01N 3/28*    (2006.01)
(Continued)

(52) U.S. Cl.
CPC ......... *F01N 3/2892* (2013.01); *F01N 3/2066* (2013.01); *F01N 3/2821* (2013.01);
(Continued)

(58) Field of Classification Search
CPC .... F01N 3/2066; F01N 3/2821; F01N 3/2892; F01N 13/009; F01N 2470/18; F01N 2610/14
See application file for complete search history.

(56) References Cited

U.S. PATENT DOCUMENTS

RE33,118 E * 11/1989 Scheitlin ............... F01N 3/0211
                                                          422/168
5,484,575 A    1/1996 Steenackers
(Continued)

FOREIGN PATENT DOCUMENTS

CN    101646844    2/2010
CN    101675222    3/2010
(Continued)

*Primary Examiner* — Phutthiwat Wongwian
*Assistant Examiner* — Matthew T Largi
(74) *Attorney, Agent, or Firm* — Cozen O'Connor

(57) ABSTRACT

An exhaust-gas treatment unit includes: a supply line, for exhaust gas, having an entry opening and an exit opening, and a first exhaust-gas treatment body into which the exhaust gas flows through the entry opening and out of which the exhaust gas exits at the exit opening; a housing into which the supply line extends via the exit opening, the housing forming an intermediate space around the supply line; an outlet space in the housing being arranged laterally with respect to the supply line; and a dividing device arranged between the intermediate space and the outlet space. The intermediate space is configured such that the exhaust gas passes out of the intermediate space and is divided into at least two partial streams which, in the direction of the outlet space, are conducted into the outlet space in opposite directions by at least two openings formed by the dividing device.

9 Claims, 3 Drawing Sheets

(51) Int. Cl.
*F01N 3/20* (2006.01)
*F01N 13/00* (2010.01)

(52) U.S. Cl.
CPC ........ *F01N 13/009* (2014.06); *F01N 2470/18* (2013.01); *F01N 2610/14* (2013.01); *Y02T 10/24* (2013.01)

(56) References Cited

U.S. PATENT DOCUMENTS

| | | | |
|---|---|---|---|
| 5,795,658 | A | 8/1998 | Bode et al. |
| 6,767,378 | B2* | 7/2004 | Nishiyama ............ F01N 3/0814 55/309 |
| 7,549,512 | B2 | 6/2009 | Newberry |
| 8,327,629 | B2 | 12/2012 | Masuda et al. |
| 8,713,920 | B2 | 5/2014 | Brück et al. |
| 9,322,309 | B2* | 4/2016 | Beyer ....................... F01N 3/20 |
| 2003/0051449 | A1 | 3/2003 | Nishiyama et al. |
| 2006/0153761 | A1* | 7/2006 | Bandl-Konrad ... B01D 53/9431 423/239.1 |
| 2007/0289294 | A1* | 12/2007 | Werni .................... F01N 1/084 60/299 |
| 2010/0107612 | A1 | 5/2010 | Yamazaki et al. |
| 2010/0107613 | A1 | 5/2010 | Masuda et al. |
| 2010/0199645 | A1* | 8/2010 | Telford ............... B01F 3/04049 60/295 |
| 2012/0144812 | A1* | 6/2012 | Hyun .................. B01F 3/04049 60/301 |

FOREIGN PATENT DOCUMENTS

| | | | |
|---|---|---|---|
| DE | 44 26 990 | | 2/1996 |
| DE | 102 35 691 A1 | | 2/2004 |
| DE | 10235691 A1 | * | 2/2004 ............. B01J 35/04 |
| EP | 0 514 326 | | 11/1992 |
| EP | 2 143 899 A1 | | 1/2010 |
| JP | 2008-215286 | | 9/2008 |
| JP | 2011-241706 | | 12/2011 |
| WO | WO 89/00237 | | 1/1989 |
| WO | WO 96/09893 A1 | | 4/1996 |
| WO | WO 2004/063540 | | 7/2004 |
| WO | WO 2010/142647 A1 | | 12/2010 |

\* cited by examiner

EXHAUST GAS TREATMENT UNIT COMPRISING FLOW DIVIDING AND MIXING GUIDE ELEMENTS

CROSS-REFERENCE TO RELATED APPLICATIONS

This is a U.S. national stage of application No. PCT/EP2014/066324, filed on 30 Jul. 2014, which claims priority to the German Application No. 10 2013 108 745.0 filed 13 Aug. 2013, the content of both incorporated herein by reference.

BACKGROUND OF THE INVENTION

1. Field of the Invention

The invention relates to an exhaust-gas treatment unit for a motor vehicle, preferably for close-coupled use.

2. Related Art

For the increasing demands in the field of exhaust-gas treatment, it is necessary for an as far as possible homogeneous exhaust-gas mixture to be produced in a small space, such that optimum treatment of the exhaust gas can be achieved. For an SCR exhaust-gas treatment body (selective catalytic reactor) in particular, it is necessary to achieve good mixing of exhaust gas and added reducing agent, such as in particular a urea-water solution, over the entire (catalytically active) cross-sectional area of the SCR exhaust-gas treatment body.

Furthermore, it must be taken into consideration that the exhaust gas generated by modern internal combustion engines in the automotive engineering sector is relatively cool, and thus, for certain conversion reactions of the exhaust-gas treatment, it is advantageous for the exhaust-gas treatment body to be accommodated in a close-coupled position.

An already-established exhaust-gas treatment unit for close-coupled use emerges for example from WO 2010/142647. By way of the laterally overlapping arrangement of the exhaust-gas treatment units, it is possible to realize a particularly compact exhaust-gas treatment unit.

In the prior art, various other close-coupled concepts are also known, which however appear to still have potential for improvement with regard to their structural size, the homogeneity of the inflowing exhaust gas and/or the distribution of the exhaust-gas components over the cross-sectional area of the exhaust-gas treatment body.

SUMMARY OF THE INVENTION

Taking this as a starting point, it is an object of the present invention to at least partially overcome the disadvantages known from the prior art. In particular, it is sought to specify an exhaust-gas treatment unit for a motor vehicle, which exhaust-gas treatment unit has a particularly compact structural size and furthermore permits targeted adjustment of the homogeneity of the inflowing exhaust gas and/or a targeted distribution of the exhaust-gas components over the cross-sectional area of the exhaust-gas treatment body.

According to one aspect of the present invention, there is accordingly proposed an exhaust-gas treatment unit which has at least the following components:

a supply line for exhaust gas, having an entry opening and having an exit opening;

a housing into which the supply line extends by way of the exit opening and which forms an intermediate space at least around the supply line;

an outlet space in the housing, which outlet space is arranged laterally with respect to the supply line.

Furthermore, a dividing device is provided between the intermediate space and the outlet space, which intermediate space is designed such that the exhaust gas passing out of the intermediate space is divided into at least two partial streams which, in the direction of the outlet space, can be conducted into the outlet space in opposite directions by way of at least two openings that are formed by way of the dividing device.

The exhaust-gas treatment unit is designed primarily for achieving, in a small structural space, a homogeneous exhaust-gas mixture distributed (uniformly) over an entire cross section. Here, the exhaust gas is conducted via a supply line for exhaust gas into an intermediate space (formed at a lateral position). The supply line is a separate component or is a section of an exhaust line in the exhaust tract.

The housing is spaced apart from the supply line such that an (at least partially encircling) intermediate space is formed between the supply line and the housing. The supply line is in this case entirely enclosed by the housing or extends into the housing from the outside, wherein the housing can be connected (in gas-tight fashion) to the supply line in a passage region. It is particularly preferably the case that the housing is connected to the supply line only in the region of the passage of the supply line, and is otherwise spaced apart from the supply line, which extends into the housing. The intermediate space preferably encloses substantially the entire circumferential region between the housing and the supply line, with the exception of the outlet space.

Furthermore, the housing (also) forms an outlet space arranged laterally with respect to the supply line. A "lateral" arrangement means that the outlet space is at least partially overlapped by the supply line or the outlet space is positioned at the outside in the region of the shell surface of the supply line. Here, in particular, a situation is realized in which no rectilinear flow path exists from the exit opening of the supply line to the outlet space, it being the case that at least one (single or multiple) flow reversal must take place in order for the exhaust gas to be able to enter the outlet space from the supply line. For example, the supply line has a substantially rectilinear extent (in the manner of a pipe) about an axis that corresponds to the mean flow direction of the exhaust gas. The housing is, over at least a part of the supply line, offset outward relative thereto and forms, in front of the exit opening, a cap that prevents the exhaust gas from flowing linearly onward in a flow direction out of the supply line. The housing forms an outlet oriented laterally with respect to the supply line, that is to say arranged in particular in that wall of the housing offset outward (in parallel) with respect to the supply line, and accordingly in particular not arranged in the cap. Situated in front of the outlet is the outlet space, which preferably extends between the supply line and the outlet.

The outlet space may be separated from the intermediate space by way of the dividing device. This does not mean that there is gas-tight separation; rather, a flow that is diverted by the dividing device is conducted into the outlet space, wherein the outlet space is formed opposite an outlet in the housing. The outlet space is thus delimited by the dividing device, wherein the openings, with their opening area, likewise form an (imaginary) delimitation of the outlet space. In other words, this means in particular that the exhaust gas from the exit opening initially enters the intermediate space, and a non-directional, complex, preferably turbulent exhaust-gas flow is generated owing to the at least one flow reversal. The exhaust-gas flow is, by way of the dividing device, conducted via the openings into the outlet space in targeted fashion or in such a way that the exhaust-gas flow, at the transition, is divided into at least two partial streams, and the partial streams are directional; specifically, (in each case two partial streams) are oriented oppositely to one another. This is achieved in particular in that the dividing device partially closes off the intermediate space between the housing and the supply line, and forms an opening in other regions.

Owing to the fact that the partial streams are introduced in opposite directions (in particular in the cross section of the outlet space), the partial streams are mixed together in a particularly effective manner without the need for a large mixing space. In this way, the overall structural size is greatly reduced, and at the same time, a high level of homogeneity of the exhaust gas is achieved. Furthermore, the exhaust gas will, owing to the opposing partial streams, expand (radially) over the maximum available cross section through which flow can pass, such that the outlet space is filled homogeneously by the exhaust gas. Likewise, the back pressure is not particularly high because the partial streams are directional and are thus mixed with little swirling and (virtually) without flow shadow zones in the housing or in the outlet space.

The exhaust gas of the proposed exhaust-gas treatment unit is, in the partial streams, preferably oppositely directed in a direction that lies in the casing volume formed in the intermediate space between the supply line and the housing, for example in a circumferential direction.

It is preferable for there to be situated in the supply line a first exhaust-gas treatment body, for example a diesel oxidation catalytic converter, owing to which the exhaust gas enters the intermediate space, preferably in laminar fashion, in an axial orientation of the supply line. A honeycomb body may be used for this purpose. Furthermore, it is preferable for a dosing unit for a reducing agent, for example a urea-water solution or ammonia, to open into the intermediate space and/or outlet space, wherein the reducing agent is introduced in gaseous and/or droplet form and is mixed homogeneously with the exhaust gas owing to the guidance of the flow in the exhaust-gas treatment unit proposed here.

A preferred embodiment provides a dosing unit for gaseous ammonia or a dosing unit for (atomized) liquid reducing agent metering, wherein the latter dosing unit forms a spray cone which, with respect to an exhaust-gas flow, at least with respect to an exhaust-gas flow in a discharge direction from the engine to the surroundings, has no directional component toward the first exhaust-gas treatment body. In this case, the first exhaust-gas treatment body is advantageously a pure diesel oxidation catalytic converter.

In another embodiment, a liquid (atomized) reducing agent is metered in at least partially counter to the main flow direction of the exhaust gas emerging from the first exhaust-gas treatment body. Here, the reducing agent can be applied in a well-distributed manner to the exit opening of the supply line and thus to the outlet side of the first exhaust-gas treatment body. In the region of the exit opening, the first exhaust-gas treatment body preferably has a hydrolytic coating that supports a decomposition of the reducing agent into ammonia and solvent. The first exhaust-gas treatment body is in this case very particularly preferably hydrolytically coated over approximately 10% of its overall length in the region adjoining the exit side, and coated with a diesel oxidation catalyst over the (entire) remaining region. In this embodiment, despite the small available mixing space, storage or buffering of the required amount of reducing agent is possible, and the dosing unit is conserved, in particular in the presence of relatively low exhaust-gas flow rates.

In both cases, the reducing agent is metered in very early, that is to say at the latest immediately downstream of the exit opening of the first exhaust-gas treatment body as viewed in the discharge direction. Thus, the entire path between the exit opening of the first exhaust-gas treatment body and inlet opening of the second exhaust-gas treatment body can be utilized for mixing purposes.

In a further advantageous embodiment of the exhaust-gas treatment unit, the outlet space is adjoined by an inlet opening of the second exhaust-gas treatment body.

In this preferred exemplary embodiment, the outlet space forms the entire mixing chamber for the exhaust gas. The outlet space is in this case configured, by way of the dividing device, such that the exhaust gas is adequately mixed and homogenized in order to undergo treatment in a second exhaust-gas treatment body which, by way of its inlet opening, directly adjoins the outlet space. In a particularly preferred variant, the housing forms a pipe cross section spaced apart in parallel, and preferably concentrically, with respect to the cross section of the supply line, wherein the inlet opening of the second exhaust-gas treatment body adjoins the housing wall directly without an intermediate piece. Here, it is pointed out that the inlet opening delimits the entrance of the exhaust-gas treatment body and (catalytic) treatment of the exhaust gas takes place already proceeding from the inlet opening. For example, the exhaust gas strikes a catalytically coated honeycomb body, constructed preferably from metal foils or a ceramic extrudate, directly adjacent to the outlet space.

The second exhaust-gas treatment body is particularly preferably arranged with its inlet opening obliquely or transversely with respect to the axial orientation of the housing, such that a deviation from the, for example, purely circular cross section is provided at the transition between the inlet opening and the outlet space. In this way, it is possible for a preferably planar entry opening of the second exhaust-gas treatment body to form a gas-tight connection. Here, the focus of this embodiment is on the fact that no further intermediate elements are provided. The outlet space then forms at least the end region of a mixing chamber composed of the intermediate space and the outlet space. It is thus possible to achieve good mixing without a large spatial extent and without an excessive back pressure. It is particularly preferable for the axial extent of the outlet space, that is to say the spacing from an opening and/or the shell surface of the supply line to the inlet opening, to be less than 100 mm [millimeters], preferably less than 65 mm or even 50 mm. Taking into consideration the manner in which the reducing agent is dosed and/or the arrangement of the exhaust-gas treatment bodies relative to one another, the axial extent should also have a minimum axial extent such as, for example, 20 mm [millimeters] or 35 mm.

The second exhaust-gas treatment body is, for example, an SCR (selective catalytic reduction) catalytic converter. Here, in conjunction with an introduction of reducing agent in the intermediate space and/or outlet space, a particularly homogeneous distribution of the reducing agent in the exhaust gas, and maximum radial propagation of the mixture before the exhaust gas enters the entry surface of the second exhaust-gas treatment body, are achieved.

In a further advantageous embodiment of the exhaust-gas treatment unit, the dividing device has at least one first guide element and one second guide element, wherein the first guide element is formed by a first separate sheet-metal element and the second guide element is formed by a second separate sheet-metal element, which sheet-metal elements are spaced apart from one another.

The first guide element serves in particular to obstruct the direct or shortest flow path for the exhaust gas between the exit opening and the outlet in the outlet space, such that mixing of the exhaust gas is already supported here. In particular, undesirably short exhaust-gas flow paths or undesirably short residence times of the exhaust gas in the housing are prevented by way of the first guide element. The second guide element is in particular formed so as to divide the exhaust-gas flow that is diverted by the first guide element into at least two partial streams, and to supply at least one of the partial streams to a further opening. Here, the first guide element and the second guide element are arranged relative to one another such that at least two of the partial streams are conducted in opposite directions through the openings.

For particularly straightforward manufacture and flexible assembly, it is proposed that the guide elements be formed by separate sheet-metal elements. The sheet-metal elements however have the further advantage, aside from easy processing, that they exhibit good stability with a small material thickness, and thus do not unduly take up the small structural space. The sheet-metal elements are preferably formed, by way of suitable roundings and curves, such that flow separation and thus flow shadow zones are prevented from arising.

In a further advantageous embodiment of the exhaust-gas treatment unit, the dividing device has at least one first guide element and one second guide element arranged to both sides of the outlet space. Here, it is preferable for these to be arranged at least partially parallel to one another and/or parallel to the outlet opening.

By way of the first guide element and the second guide element, the at least two partial streams are conducted in directional fashion into the outlet space by the dividing device, such that at least two of the partial streams are directed toward one another in opposite directions. Here, the first guide element and the second guide element need not always be designed to define the ultimate orientation of the partial streams; it may rather suffice for the flow to be smoothly diverted into partial streams and supplied to the openings. In this regard, it is particularly advantageous for at least one of the guide elements to be arranged parallel to the exit opening of the supply line, whereby it is made possible for the partial streams to be diverted with little generation of back pressure. In particular, a diversion is through 90°, that is to say into the plane relative to which the flow direction of the exhaust gas emerging from the outlet opening is oriented normally. It is already possible in this way to realize advantageous premixing, wherein here, adequate homogeneity is not yet achieved.

By way of the arrangement of the guide elements to both sides of the outlet space, it is ensured that the exhaust gas is conducted in targeted fashion to the openings. By way of the partial parallel arrangement relative to one another, and preferably a transverse arrangement of the guide elements relative to the entry direction of the exhaust gas through the opening, it is ensured that the exhaust gas is introduced into the outlet space with (virtually) the same flow characteristic, such that particularly homogeneous mixing is supported here. It is thus particularly preferable for the guide elements to be oriented parallel to one another in the region of the transition to a respective opening, and for the openings to also be oriented parallel to one another. With such a flow diversion, it is possible in particular for flow separation, and thus also the generation of flow shadow zones, to be prevented. Flow shadow zones do not contribute to the mixing process, and constrict the available mixing space, and thus potentially increase the back pressure. The diversion is very particularly preferably designed such that, in the case of a laminar inflow, the laminar flow state is not disrupted, that is to say is maintained. However, the exhaust gas preferably flows in turbulent fashion in the intermediate space and in the outlet space, because here, kinetic mixing also takes place in addition to the diffusive mixing.

In a further advantageous embodiment of the exhaust-gas treatment unit, the dividing device has at least one first guide element and one second guide element, wherein the second guide element has a guide section that extends in the intermediate space laterally with respect to the supply line and so as to be inclined relative to the exit opening.

With the guide section, it is achieved that the exhaust gas that flows in via the wall of the supply line is divided into two partial streams, wherein, owing to the inclination of the guide section relative to the outlet opening, a guided diversion of the exhaust-gas flow is achieved. In this preferred embodiment, by way of the first sheet-metal element, the exhaust gas is diverted such that at least a major part of the exhaust-gas flow is guided around the outer circumference of the supply line in the intermediate space and, there, arrives at the guide section, whereby the two partial streams are divided. In this way, it is possible for a particularly low back pressure to be generated, and at the same time for the exhaust-gas stream to be divided into multiple oppositely directed partial streams.

Embodiments are also possible in which the guide section does not have a rectilinear inclination but diverts at least a partial stream into an inclined angle. For this purpose, the guide section may, for example, be oriented parallel to the inflow direction in a first inflow region and subsequently curved, as far as the opening, with at least one radius of curvature, preferably two opposing radii of curvature. It is thus not ruled out that the guide section also has regions oriented, for example, parallel to the outlet opening. It is crucial that the guide section is designed such that a smooth diversion or smooth division is made possible.

In a further advantageous embodiment of the exhaust-gas treatment unit, the at least one part of the dividing device that forms the opening is formed out of the housing in unipartite fashion.

In this particularly preferred embodiment, no additional structural elements are provided, but rather the housing itself forms the dividing device, wherein the guide surfaces of the dividing device are formed by depressions and elevations in the housing. This permits particularly simple manufacture, which is suitable in particular for mass production, because the dividing device can be formed without additional joining processes, for example by way of one forming tool. In particular, in this embodiment, it is possible for the supply line to be easily inserted in positively locking fashion into the housing.

In a further advantageous embodiment of the exhaust-gas treatment unit, the openings are oriented oppositely to one another. The openings are preferably also arranged offset with respect to one another.

By the arrangement of the openings oppositely to one another, particularly good homogenization is achieved in a small space. In particular, by virtue of the openings being arranged offset relative to one another, it is possible for a swirling flow to be generated, which permits homogenization with a particularly low back pressure action. It is very particularly preferable for three or four partial streams to be provided, wherein two are oriented (diametrically) oppositely to one another, and the at least one further partial stream is oriented transversely with respect to the opposing partial streams. It is very particularly preferably the case that only two partial streams are oriented oppositely and are accelerated (slightly) by way of a cross-sectional constriction, such that a suction action is generated that causes further partial streams to be smoothly mixed in. In particular, the two opposing partial streams may in this case have the smaller volume fraction, such that the back pressure owing to the acceleration remains low and the suction effect nevertheless achieves excellent (kinetic) mixing of the partial streams.

In a further advantageous embodiment of the exhaust-gas treatment device, at least one guide surface, preferably a metal sheet, is provided in the region of at least one opening, wherein the guide surface is preferably arranged so as to be at least partially inclined relative to an outflow direction of the opening.

The at least one guide surface may be arranged upstream and/or downstream of the opening as viewed in a flow direction. A guide surface upstream of the opening ensures a particularly targeted transition to the desired flow direction into the outlet space, whereby stagnation flows and the like are avoided. By a guide surface downstream of the opening, it is possible for the flows to be diverted further in the outlet space, or to be diverted into the desired flow direction for the first time there. The latter arrangement may be advantageous in particular in the case of very small arrangements if, in this way, for space reasons, a smoother diversion of the exhaust-gas partial streams is made possible.

The preferred design variant of the guide element or of the guide surface composed of one or more metal sheets permits particularly simple manufacture. Here, the metal sheet may be provided as a separate element, or else may be formed integrally with a metal sheet that forms the dividing device, or else may be formed integrally with the housing. Here, the metal sheet may bridge the intermediate space from the housing to the supply line, or else may project into the intermediate space from one side.

In a further advantageous embodiment of the exhaust-gas treatment device, the dividing device comprises at least one guide surface oriented such that partial streams strike one another frontally or at an angle.

Through the diversion of the partial streams such that these strike one another frontally, particularly intense mixing is achieved, which results in particularly good homogenization in an extremely small space. In the case of a diversion of the partial streams such that they strike one another at an angle, the partial streams cross through one another, which achieves particularly smooth mixing, wherein numerous small turbulent vortices are nevertheless generated which effect good (kinetic) mixing and homogenization of the exhaust gas.

According to a further aspect of the invention, a motor vehicle having an internal combustion engine with an exhaust line is proposed, wherein the exhaust line comprises an exhaust-gas treatment unit described here as conforming to the invention or as being advantageous.

Here, "motor vehicles" refers in particular to heavy goods vehicles and passenger motor vehicles, wherein this term also refers to ships, locomotives and aircraft. The internal combustion engine may in this case be a diesel engine or a gasoline engine, wherein the exhaust-gas treatment unit is suitable in particular for a lean-burn internal combustion engine. The exhaust line is connected directly to the combustion chamber, generally a cylinder or swept volume, and in this case comprises the so-called exhaust manifold. In the exhaust line, the exhaust gas undergoes (catalytic) treatment, noise deadening is performed, and the exhaust gas is cooled, and thus released into the environment in a form compliant with exhaust-gas standards. In this process, the least possible back pressure should be generated so that the internal combustion engine can achieve the highest possible level of performance. The exhaust-gas treatment unit proposed here is suitable in particular for use in a small structural space, and very preferably in the region of the exhaust manifold. Specifically in the case of lean-burn internal combustion engines, the exhaust-gas treatment is made more difficult owing to the low exhaust-gas temperatures, such that the most close-coupled arrangement possible is desirable. With the exhaust-gas treatment unit proposed here, it is possible for an exhaust-gas treatment body to be arranged very close, in particular with a spacing of less than 50 cm, particularly preferably less than 20 cm, to the outlet of the combustion chamber, without competing for space with other components in the engine bay. This is because the dimensions of the exhaust-gas treatment unit are scarcely greater than those of the exhaust manifold. It is particularly preferably the case that no turbocharger is arranged between the outlet of the combustion chamber and the exhaust-gas treatment unit, it rather being the case that a required turbocharger is positioned downstream of the exhaust-gas treatment unit in a discharge direction. Specifically, the turbocharger gives rise to intense exhaust-gas cooling, and therefore, in particular for the conversion of nitrogen oxides, an arrangement close to the combustion chamber is particularly efficient.

At the same time, the exhaust-gas treatment unit proposed here yields a particularly low back pressure with simultaneously good mixing and homogenization, in particular in the case of the injection of a reducing agent for selective catalytic reaction for the purposes of reducing the nitrogen oxides in the exhaust gas owing to the lean combustion.

The features specified individually in the claims may be combined with one another in any desired technologically meaningful way and may be supplemented by explanatory facts from the description and details from the figures, with further design variants of the invention being specified.

BRIEF DESCRIPTION OF THE DRAWINGS

The invention and the technical field will be explained in more detail below on the basis of the figures. The figures show particularly preferred exemplary embodiments, to which the invention is however not restricted. In particular, it should be noted that the figures and in particular the illustrated proportions are merely schematic. In the drawings.

DETAILED DESCRIPTION OF THE PRESENTLY PREFERRED EMBODIMENTS

Figure 1:
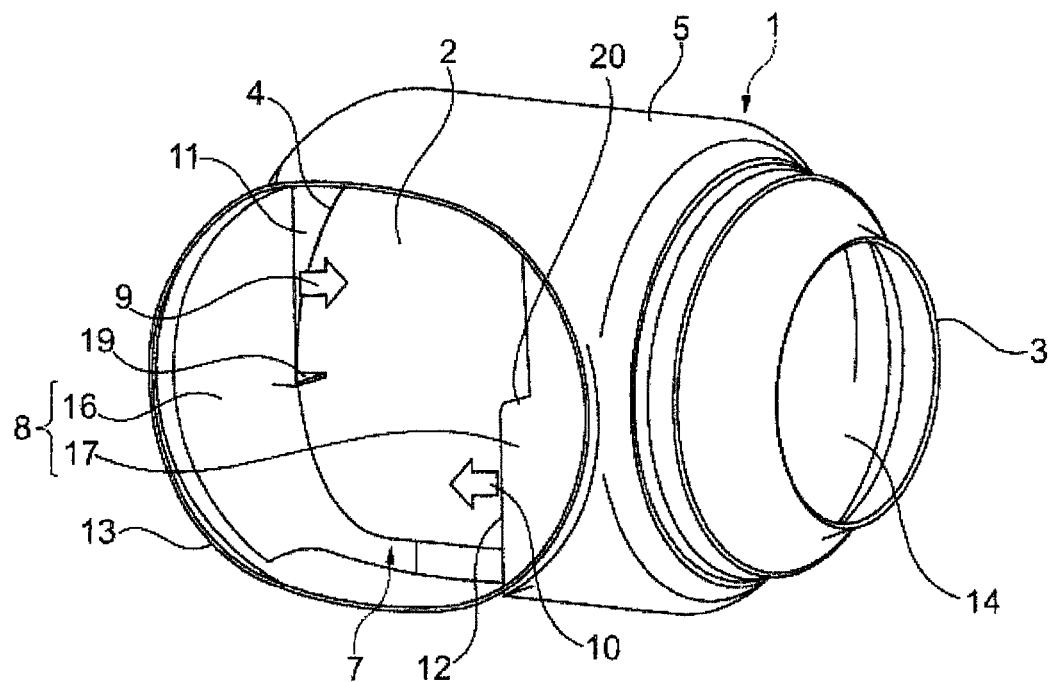
FIG. 1 shows an exhaust-gas treatment unit with two sheet-metal elements.

FIG. 1 shows an exhaust-gas treatment unit 1 in which a dividing device 8 is formed from a first guide element 16 and a second guide element 17, which first and second guide elements are arranged as separate sheet-metal parts in the housing 5 of the exhaust-gas treatment unit 1 on the supply line 2. In the supply line 2 there is situated a first exhaust-gas treatment body 14 into which the exhaust gas flows through the entry opening 3 (on the right in this illustration) and out of which the exhaust gas exits again at the exit opening 4 (on the left in this illustration). Owing to the first guide element 16, the outflowing exhaust gas cannot flow directly out of the exit opening 4 into the outlet space 7, but rather is, in part, conducted into the outlet space 7 via the supply line 2 and through the first opening 11 and the second opening 12 as first partial stream 9 and second partial stream 10. Furthermore, for the orientation of the partial streams 9, 10, a first guide surface 19 is provided at the first opening 11, and a second guide surface 20 is provided at the second opening 12. The outlet space 7 is adjoined directly by the inlet opening 13.

Figure 2:
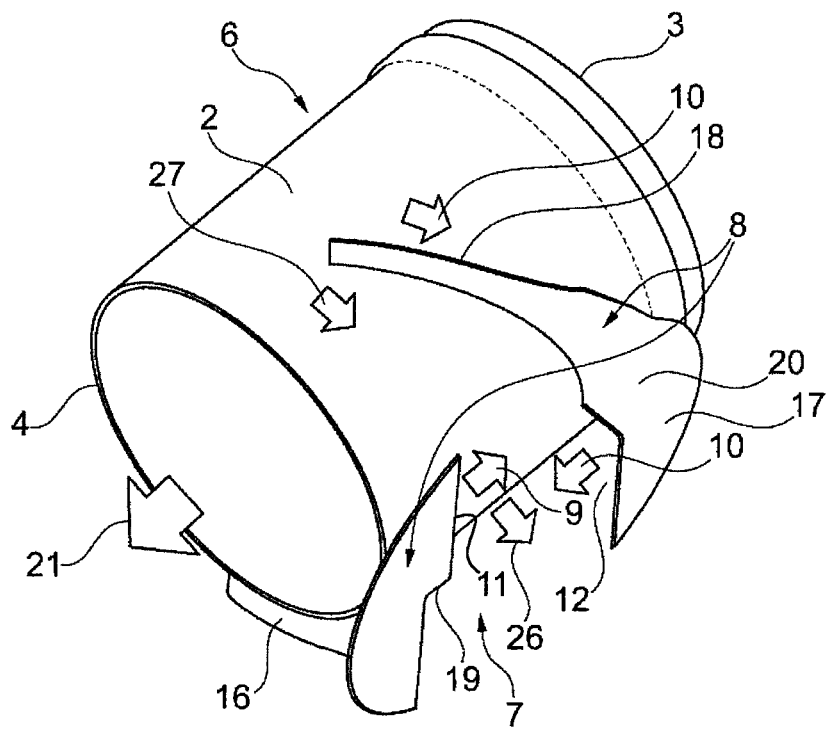
FIG. 2 shows a supply line with dividing device.

FIG. 2 shows the supply line 2 on its own with the first guide element 16 and the second guide element 17 in a different view to that illustrated in FIG. 1. It can be seen in this figure how the exhaust gas flows into the supply line 2 through the entry opening 3 and flows out of the exit opening 4 in the outflow direction 21 into the intermediate space 6 (not bounded here owing to the fact that the housing 5 is not illustrated). By the first guide element 16, at least a part of the exhaust gas is diverted around the supply line 2, and from there, is divided into further partial streams by the guide section 18 of the second guide element 17. Here, the guide section 18 is situated so as to be inclined at approximately 45° relative to the exit opening 4. In the outlet space 7, which is also not clearly bordered, a (slightly) accelerated first partial stream is metered in (from the right in the figure) via the first guide element 16 and the second guide element 17, in particular via the guide section 18, and a (slightly) accelerated second partial stream 10 is metered in (from the left in the figure) via the first opening 11 and the second opening 12 and conducted over the first guide surface 19 and second guide surface 20. Furthermore, a third partial stream 26 is (transversely) drawn in (from the bottom in the figure) and a fourth partial stream 27 is drawn in (from the top in the figure) by the accelerated first partial stream 9 and second partial stream 10.

Figure 3:
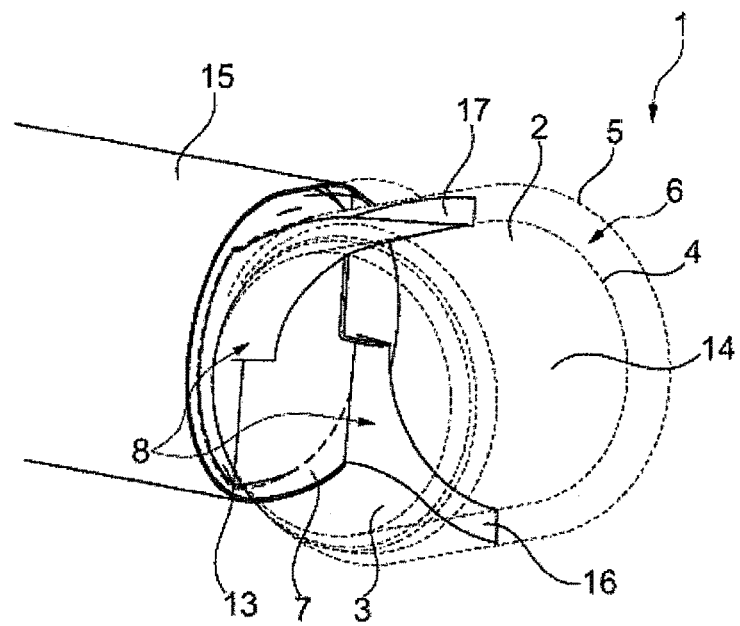
FIG. 3 shows an exhaust-gas treatment unit with an exhaust-gas treatment body connected downstream.

FIG. 3 shows a construction of an exhaust-gas treatment unit 1 as shown in FIG. 1, wherein here, the outlet space 7 is adjoined by the inlet opening 13 of a second exhaust-gas treatment body 15. In this view, it can be clearly seen that the intermediate space 6 is formed between the housing 5 and the supply line 2, whereas the outlet space 7 is delimited by the dividing device 8 and the inlet opening 13.

Figure 4:
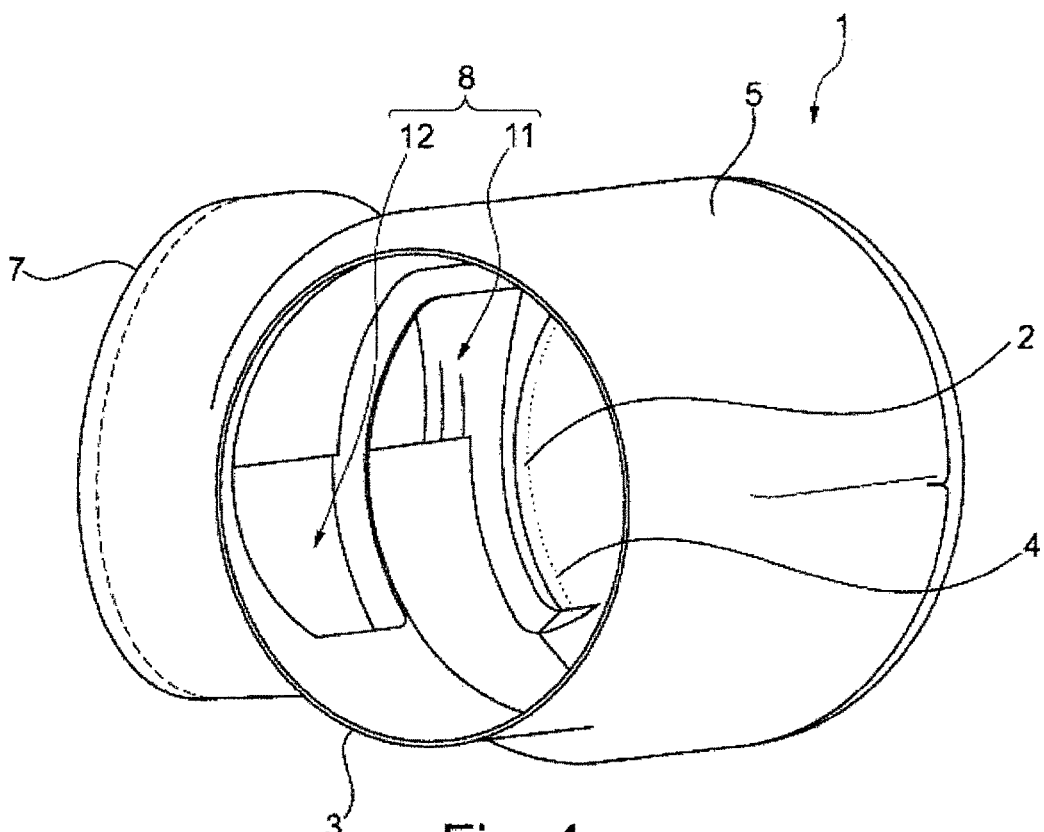
FIG. 4 shows a housing in which the dividing device of the exhaust-gas treatment unit is formed integrally with the housing.

FIG. 4 shows an exhaust-gas treatment unit 1, wherein in this figure, the supply line 2 is indicated merely by the dotted line of the entry opening 3 and exit opening 4. The housing 5 of the exhaust-gas treatment unit 1 forms the dividing device 8 in unipartite fashion, wherein here, ducts are formed that adjoin the outlet space 7 at a first opening 11 and at a second opening 12.

Figure 5:
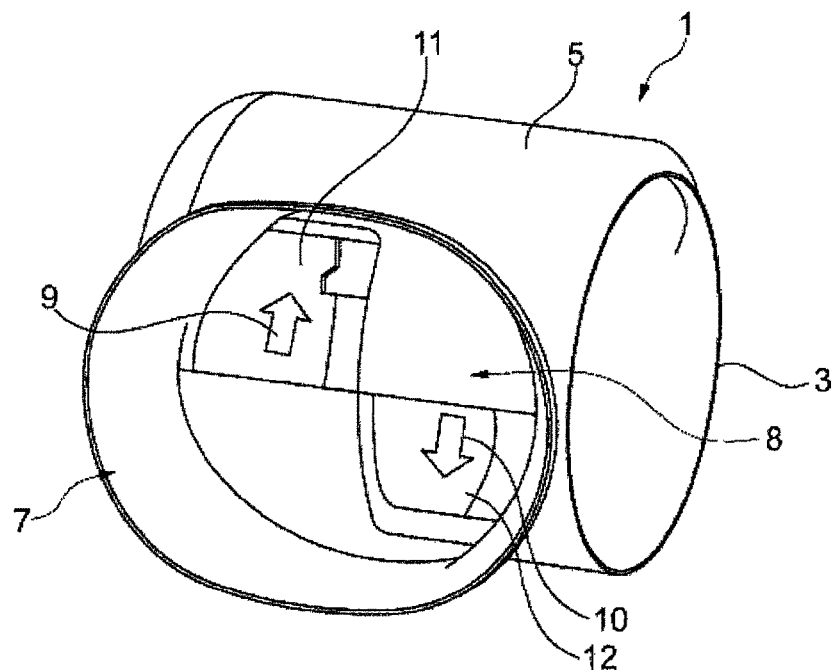
FIG. 5 shows a further view of the housing as in FIG. 4.

FIG. 5 shows a different perspective of the exhaust-gas treatment unit 1 to that shown in FIG. 4, wherein here, the first opening 11 and the second opening 12 in the housing 5 can be clearly seen. In this variant, the first partial stream 9 and the second partial stream 10 are oriented oppositely to one another in the circumferential direction of the supply line.

Figure 6:
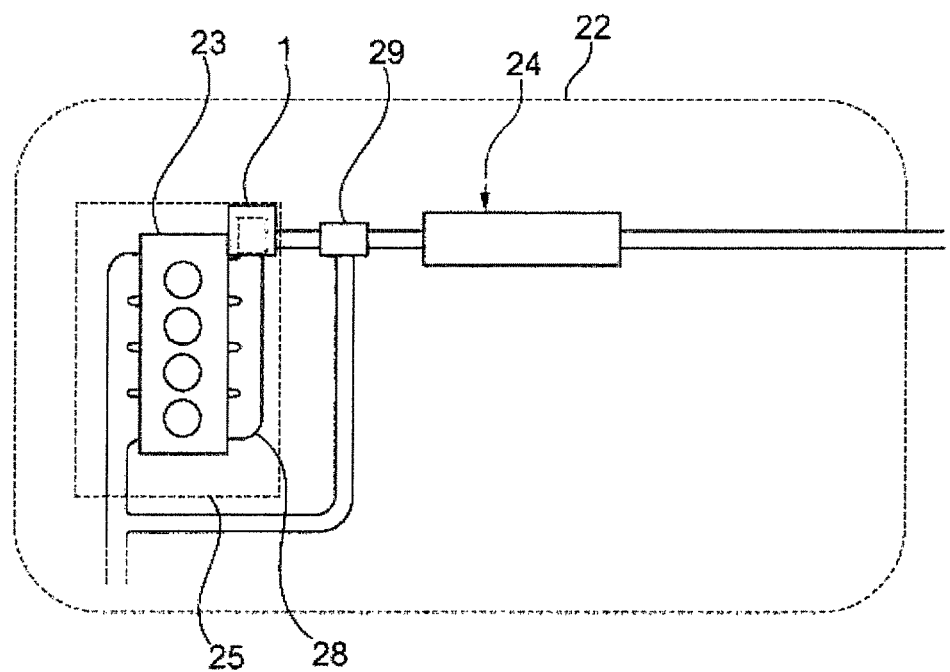
FIG. 6 schematically shows a motor vehicle with an internal combustion engine and exhaust line.

FIG. 6 schematically illustrates a motor vehicle 22 that has an internal combustion engine 23 to which there is connected an exhaust line 24, which exhaust line comprises an exhaust-gas treatment unit 1 as shown, for example, in the preceding figures. In this preferred example, the exhaust-gas treatment unit 1 is connected directly to the exhaust manifold 28 and is situated in the engine bay 25, such that the temperature is particularly high here and, even in the case of a lean-burn internal combustion engine 23, good conversion, in particular of nitrogen oxides, is made possible. This effect is supported in that the turbocharger 29 is arranged downstream of the exhaust-gas treatment unit 1 in a discharge direction, and thus the temperature in the exhaust line 24 falls (to a considerable extent) for the first time downstream of the turbocharger 29.

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to here and/or a person skilled in the art identifies that the basic functions of the device can no longer be realized otherwise.

With the exhaust-gas treatment unit proposed here, it is possible, in a small structural space, to achieve good mixing and homogenization of the exhaust gas, in particular in the case of a reducing agent being injected, without an excessive back pressure being generated in the process.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SYMBOLS

1 Exhaust-gas treatment unit
2 Supply line
3 Entry opening
4 Exit opening
5 Housing
6 Intermediate space
7 Outlet space
8 Dividing device
9 First partial stream
10 Second partial stream
11 First opening
12 Second opening
13 Inlet opening
14 First exhaust-gas treatment body
15 Second exhaust-gas treatment body
16 First guide element
17 Second guide element
18 Guide section
19 First guide surface
20 Second guide surface 21 Outflow direction
22 Motor vehicle
23 Internal combustion engine
24 Exhaust line
25 Engine bay
26 Third partial stream
27 Fourth partial stream
28 Exhaust manifold
29 Turbocharger

The invention claimed is:

1. An exhaust-gas treatment unit (1), comprising:
   a supply line (2) for exhaust gas, the supply line (2) having an entry opening (3) and an exit opening (4), and a first exhaust-gas treatment body (14) into which the exhaust gas flows through the entry opening (3) and out of which the exhaust gas exits at the exit opening (4), the supply line (2) having a rectilinear extent about an axis that corresponds to a mean flow direction of the exhaust gas;
   a housing (5) into which the supply line (2) extends by way of the exit opening (4), the housing (5) forming an intermediate space (6) at least around the supply line (2), the housing (5) being, over at least part of the supply line (2), offset outward relative to the supply line (2) so as to form, downstream of the exit opening (4), a cap that prevents the exhaust gas from flowing linearly onward in a flow direction out of the supply line (2);
   an outlet space (7) in the housing (5), the outlet space (7) being arranged laterally with respect to the supply line (2) and forming an opening in a side of the housing, the opening facing in a direction perpendicular to the lateral extent of the supply line (2); and
   a dividing device (8) arranged between the intermediate space (6) and the outlet space (7), the intermediate space (6) being configured such that the exhaust gas passes out of the intermediate space (6) and is divided into at least two partial streams (9, 10) which, in the direction of the outlet space (7), are conducted into the outlet space (7) in opposite directions by at least two openings (11, 12) formed by the dividing device (8),
   wherein the dividing device (8) comprises a first guide element (16) and a second guide element (17) arranged on respective sides of the outlet space (7), the first guide element (16) and the second guide element (17) being arranged such that at least a portion of the first guide element (16) is parallel to at least a portion of the second guide element (17).

2. The exhaust-gas treatment unit (1) as claimed in claim 1, wherein the outlet space (7) is adjoined by an inlet opening (13) of a second exhaust-gas treatment body (15).

3. The exhaust-gas treatment unit (1) as claimed in claim 1, wherein the first guide element (16) is formed by a first separate sheet-metal element and the second guide element (17) is formed by a second separate sheet-metal element, the first and second sheet-metal elements being spaced apart from one another.

4. The exhaust-gas treatment unit (1) as claimed in claim 1, wherein the second guide element (17) has a guide section (18) extending in the intermediate space (6) laterally with respect to the supply line (2) and so as to be inclined relative to the exit opening (4).

5. The exhaust-gas treatment unit (1) as claimed in claim 1, wherein the dividing device (8), which forms at least a part of the at least two openings (11, 12), is formed from the housing (5) in unipartite fashion.

6. The exhaust-gas treatment unit (1) as claimed in claim 1, wherein the at least two openings (11, 12) are oriented oppositely to one another.

7. The exhaust-gas treatment unit (1) as claimed in claim 1, wherein at least one guide surface (19, 20) is arranged proximate to at least one of the at least two openings (11, 12), wherein the at least one guide surface (19, 20) is arranged so as to be at least partially inclined relative to an outflow direction (21) of the at least two openings (11, 12).

8. The exhaust-gas treatment unit (1) as claimed in claim 1, wherein the dividing device (8) comprises at least one guide surface (19, 20) oriented such that partial streams (9, 10) strike one another frontally or at an angle.

9. A motor vehicle (22) having an internal combustion engine (23) with exhaust line (24), wherein the exhaust line (24) comprises an exhaust-gas treatment unit (1) as claimed in claim 1.

* * * * *